(12) United States Patent
Kawamata et al.

(10) Patent No.: US 10,949,683 B2
(45) Date of Patent: Mar. 16, 2021

(54) RECOGNITION SUPPORT SYSTEM FOR VEHICLE

(71) Applicant: TOYOTA JIDOSHA KABUSHIKI KAISHA, Toyota (JP)

(72) Inventors: Shinya Kawamata, Toyota (JP); Fumio Sugaya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 16/047,093

(22) Filed: Jul. 27, 2018

(65) Prior Publication Data
US 2019/0095726 A1 Mar. 28, 2019

(30) Foreign Application Priority Data
Sep. 22, 2017 (JP) .............................. JP2017-182661

(51) Int. Cl.
*G06K 9/00* (2006.01)
*B60Q 1/00* (2006.01)
*G08G 1/16* (2006.01)

(52) U.S. Cl.
CPC ........... *G06K 9/00805* (2013.01); *B60Q 1/00* (2013.01); *G06K 9/00798* (2013.01); *G08G 1/166* (2013.01)

(58) Field of Classification Search
CPC ................................................ G06K 9/00805
See application file for complete search history.

(56) References Cited

U.S. PATENT DOCUMENTS

| | | | |
|---|---|---|---|
| 2006/0072914 A1* | 4/2006 | Arai | G01C 3/18 396/106 |
| 2008/0019567 A1* | 1/2008 | Takagi | G06K 9/00369 382/103 |

(Continued)

FOREIGN PATENT DOCUMENTS

| | | |
|---|---|---|
| JP | 2008-207677 A | 9/2008 |
| JP | 2009-220631 A | 10/2009 |
| JP | 2014-046838 A | 3/2014 |

OTHER PUBLICATIONS

Liu et al., "Detection and recognition of traffic signs in adverse conditions", 2009 IEEE Intelligent Vehicle Symposium, Jun. 3-5, 2009, pp. 335-340. (Year: 2009).*

*Primary Examiner* — Nay A Maung
*Assistant Examiner* — Jose M Torres
(74) *Attorney, Agent, or Firm* — Sughrue Mion, PLLC

(57) ABSTRACT

A recognition support system for a vehicle includes an image recognition sensor including a camera configured to capture an image of a periphery of a host vehicle while alternately repeating an exposure period and a non-exposure period; an irradiation device configured to irradiate light to the periphery of the host vehicle; an object recognition unit configured to recognize an object existing in the periphery of the host vehicle by using the image recognition sensor; and a light irradiation control unit configured to, when the object recognized by the object recognition unit is an alert target object, carry out intermittent irradiation of light to the alert target object by using the irradiation device, the intermittent irradiation being carried out such that an irradiation period of light and a non-irradiation period of light are alternately repeated and the non-irradiation period overlaps with at least part of the exposure period.

6 Claims, 3 Drawing Sheets

(56) References Cited

U.S. PATENT DOCUMENTS

| | | |
|---|---|---|
| 2008/0205705 A1 | 8/2008 | Kashimura |
| 2013/0088598 A1* | 4/2013 | Muramatsu .............. H04N 7/18 348/148 |
| 2013/0229520 A1* | 9/2013 | Aimura .............. G06K 9/00805 348/148 |
| 2014/0062685 A1 | 3/2014 | Tamatsu et al. |
| 2016/0280229 A1* | 9/2016 | Kasahara .............. B60S 1/0844 |

* cited by examiner

RECOGNITION SUPPORT SYSTEM FOR VEHICLE

INCORPORATION BY REFERENCE

The disclosure of Japanese Patent Application No. 2017-182661 filed on Sep. 22, 2017 including the specification, drawings and abstract is incorporated herein by reference in its entirety.

BACKGROUND

1. Technical Field

The disclosure relates to a recognition support system for a vehicle.

2. Description of Related Art

Japanese Unexamined Patent Application Publication No. 2014-046838 (JP 2014-046838 A) describes a pedestrian notification system. With this pedestrian notification system, whether there is a pedestrian around a host vehicle is determined with the use of a camera. Then, marking light is irradiated to a pedestrian that the vehicle has recognized to notify the pedestrian of the fact that the vehicle has recognized.

SUMMARY

In a system that recognizes a pedestrian with the use of an image recognition sensor that uses a camera as in the case of the technique described in JP 2014-046838 A, when marking light is continuously irradiated to a pedestrian without any special consideration, the marking light changes the appearance of the pedestrian in an image. This interferes with pedestrian recognition. A recognition target in an image, which provides inconvenience resulting from such light irradiation, includes not only an alert target object, such as a pedestrian, that is alerted by a recognition support system but also, for example, a white line on a road. An example of a white line will be described. Depending on the shape and position of light to be irradiated, irradiated light may be erroneously recognized as a white line.

The disclosure provides a recognition support system for a vehicle, which irradiates light to an alert target object recognized with the use of an image recognition sensor including a camera and which is configured to be able to reduce a change of the appearance of a recognition target in an image resulting from irradiation of light.

A first aspect of the disclosure provides a recognition support system for a vehicle. The recognition support system according to the first aspect includes: an image recognition sensor including a camera configured to capture an image of a periphery of a host vehicle while alternately repeating an exposure period and a non-exposure period; an irradiation device configured to irradiate light to the periphery of the host vehicle; an object recognition unit configured to recognize an object existing in the periphery of the host vehicle by using the image recognition sensor; and a light irradiation control unit configured to, when the object recognized by the object recognition unit is an alert target object, carry out intermittent irradiation of light to the alert target object by using the irradiation device, the intermittent irradiation being carried out such that an irradiation period of light and a non-irradiation period of light are alternately repeated and the non-irradiation period overlaps with at least part of the exposure period.

With the above configuration, in comparison with an example in which light is continuously irradiated without any special consideration to an exposure and non-exposure of the camera, an irradiation time in an exposure period shortens. For this reason, according to the disclosure, it is possible to reduce reflection of irradiated light in an image that is captured by the camera, so it is possible to reduce a change of the appearance of a recognition target in the image resulting from irradiation of light.

In the first aspect, the intermittent irradiation may be carried out such that the non-irradiation period coincides with the exposure period and the irradiation period coincides with the non-exposure period.

In the first aspect, the intermittent irradiation may be carried out such that the irradiation period and the non-irradiation period are alternately repeated in a period from when the intermittent irradiation to the alert target object is started to when the intermittent irradiation to the alert target object ends.

In the first aspect, the intermittent irradiation may be carried out such that switching between the non-irradiation period and the irradiation period is performed at intervals of one hundred milliseconds or shorter.

A second aspect of the disclosure provides a recognition support system for a vehicle. The recognition support system according to the second aspect includes: an image recognition sensor including a camera configured to capture an image of a periphery of a host vehicle while alternately repeating an exposure period and a non-exposure period; an irradiation device configured to irradiate light to the periphery of the host vehicle; and an electronic control unit configured to recognize an object existing in the periphery of the host vehicle by using the image recognition sensor, the electronic control unit being configured to carry out intermittent irradiation of light to the object by using the irradiation device, the intermittent irradiation being carried out such that an irradiation period of light and a non-irradiation period of light are alternately repeated and the non-irradiation period overlaps with at least part of the exposure period.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings. However, in the embodiment that will be described below, when the number, quantity, amount, range, or the like, of each element is described, the disclosure is not limited to the described number, quantity, amount, range, or the like, unless otherwise specified or unless obviously specified to the described number, quantity, amount, range, or the like, in theory. Structures, steps, and the like, that will be described below in the embodiment are not always indispensable for the disclosure unless otherwise specified or unless obviously specified to them in theory.

1. Configuration of Recognition Support System for Vehicle

A recognition support system for a vehicle according to the embodiment of the disclosure is a system that supports mutual recognition between a host vehicle (driver) to which the system is applied and an alert target object. Examples of the alert target object include a human (for example, a pedestrian and a bicycle) and an animal. Hereinafter, in the present embodiment, a pedestrian is taken as the target object for instance.

Figure 1:
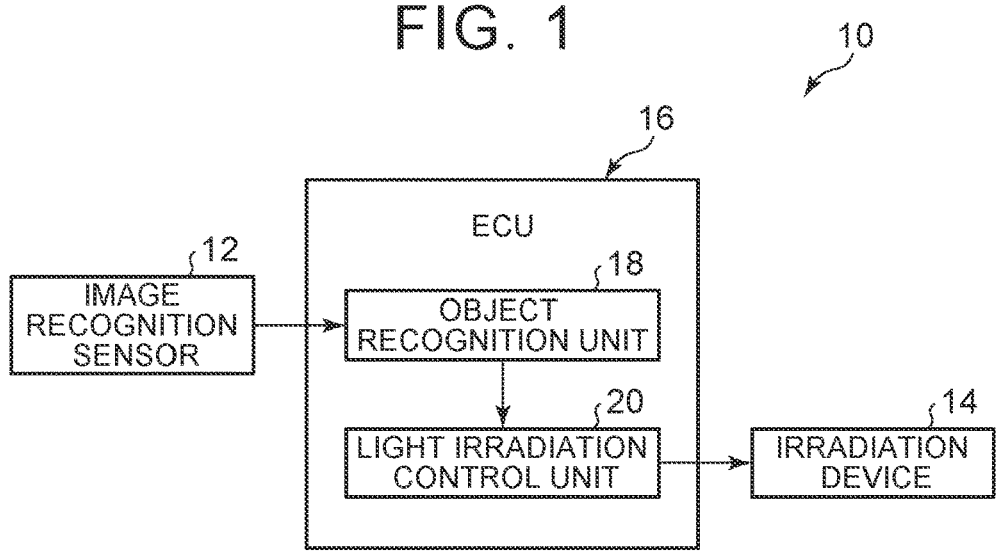
FIG. 1 is a block diagram that shows an example of the configuration of a recognition support system for a vehicle according to an embodiment of the disclosure.

FIG. 1 is a block diagram that shows an example of the configuration of the recognition support system for a vehicle according to the embodiment of the disclosure. As shown in FIG. 1, the recognition support system 10 for a vehicle (hereinafter, simply referred to as recognition support system) includes an image recognition sensor 12, an irradiation device 14, and an electronic control unit (ECU) 16.

1-1. Image Recognition Sensor

Figure 2:
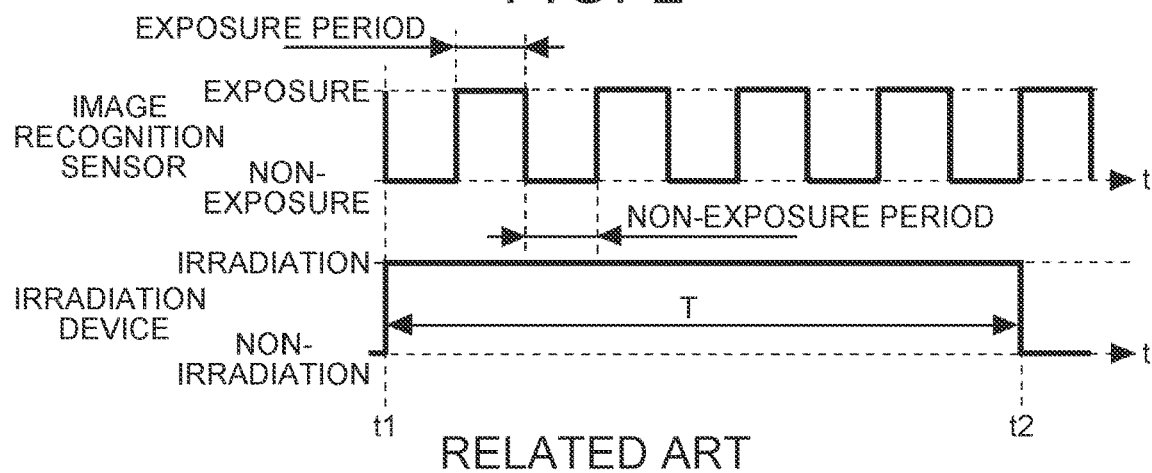
FIG. 2 is a timing chart for illustrating an example of light irradiation control (light irradiation control A) that is referenced for comparison with light irradiation control according to an embodiment of the disclosure.
Figure 4:
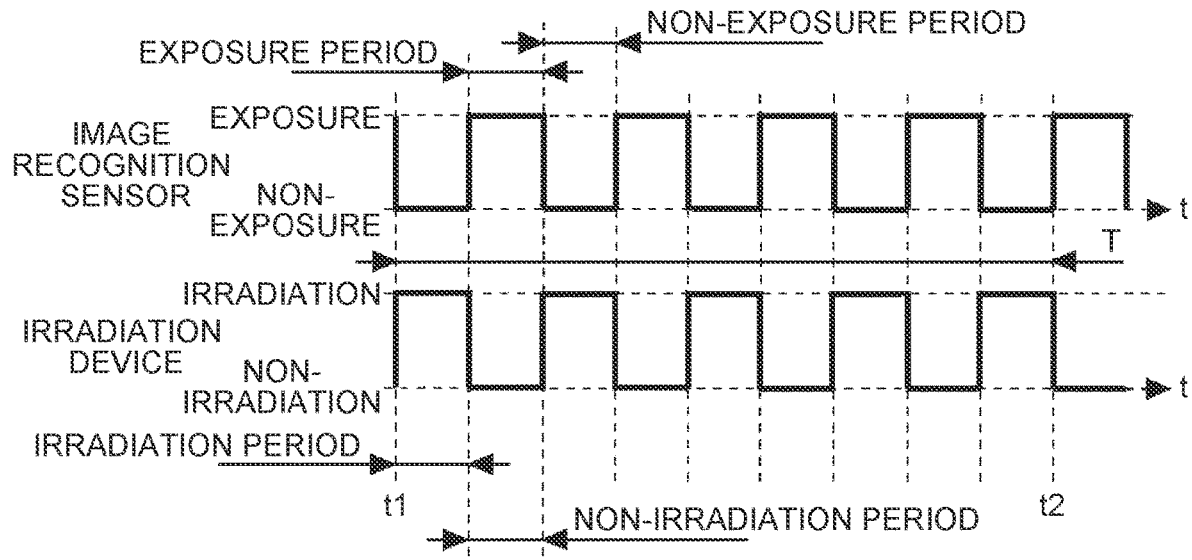
FIG. 4 is a timing chart for illustrating the light irradiation control according to the embodiment of the disclosure.

The image recognition sensor 12 includes a camera that captures an image around the host vehicle. The camera is, for example, a stereo camera that is able to measure a distance from a vehicle to a capturing target. As shown in FIG. 2 and FIG. 4 (described later), the camera alternately repeats an exposure period and a non-exposure period, when the camera captures an image around the host vehicle. The exposure period is a period in which a sensor or the like inside the camera is exposed to the light. The non-exposure period is a period in which the sensor or the like inside the camera is not exposed to the light.

1-2. Irradiation Device

The irradiation device 14 is attached to a predetermined part (for example, the inside of a headlamp unit, or a front bumper) of the vehicle in order to irradiate light to around (more specifically, forward of) the host vehicle. In more detail, the irradiation device 14 uses a marker lamp as an example to irradiate light. The shape of light that is irradiated by the irradiation device 14 is not specifically limited. For example, light with high directivity, such as laser light, may be used. Alternatively, light for guiding a pedestrian (for example, light having a shape that indicates that a pedestrian is allowed to cross (such as a pedestrian crossing shape)) or light having a shape that prompts a pedestrian to stop) may be used. The irradiation device 14 may include an actuator for adjusting the irradiation direction of light in response to the position of an alert target object in order to effectively irradiate light to the target object.

1-3. ECU

The ECU 16 includes a processor, a memory, and an input/output interface. The ECU 16 includes an object recognition unit 18 and a light irradiation control unit 20 as functional blocks related to mutual recognition support control of the present embodiment. These functional blocks do not exist as hardware in the recognition support system 10, and may be implemented as software when programs stored in the memory are executed by the processor.

The object recognition unit 18 realizes the function of recognizing an object around the host vehicle with the use of the image recognition sensor 12. Specifically, the object recognition unit 18 receives an image around the host vehicle from the image recognition sensor 12 via the input/output interface. The object recognition unit 18 recognizes the object by applying predetermined image recognition process to the received image. A typical example of the image recognition process is pattern recognition.

When an object recognized by the object recognition unit 18 is a pedestrian that is an alert target, the light irradiation control unit 20 irradiates light to the pedestrian with the use of the irradiation device 14. In more detail, irradiation of light in this case is intermittent irradiation that will be described later with reference to FIG. 4. Examples of irradiation to a pedestrian include irradiation of marking light (for example, the above-described linear light) having a selected shape toward a pedestrian or a road around a pedestrian. Any known technique may be just used to determine whether an object recognized by the object recognition unit 18 is a pedestrian that is an alert target (that is, a pedestrian to be alerted). For example, when an object recognized by the object recognition unit 18 is a pedestrian, it may be determined that the object is a pedestrian that is an alert target.

2. Mutual Recognition Support Control (Light Irradiation Control) According to Embodiment Mutual recognition support control between a vehicle (driver) and a pedestrian, which is executed in the present embodiment, is "light irradiation control" that irradiates light to a pedestrian. With such light irradiation control, it is possible to not only inform a pedestrian that the vehicle is approaching and the vehicle has recognized the pedestrian but also inform the driver of the presence of the pedestrian.

2-1. Influence of Light to be Irradiated on Image Recognition Sensor

FIG. 2 is a timing chart for illustrating an example of light irradiation control to be referenced (hereinafter, referred to as light irradiation control A for the sake of convenience) for comparison with light irradiation control according to the embodiment of the disclosure.

As described above, the camera of the image recognition sensor 12 alternately repeats an exposure period and a non-exposure period at the time of capturing an image around the host vehicle. In FIG. 2, time t1 is start timing of irradiation of light and time t2 is end timing of irradiation of light under the light irradiation control A. A period from time t1 to time t2 is a light irradiation period T, and is set as a time that is required to alert a pedestrian and a driver. As shown in FIG. 2, irradiation under the light irradiation control A is continuously carried out (hereinafter, referred to as "continuous irradiation") in the irradiation period T.

As marking light is continuously irradiated to a pedestrian with the use of the light irradiation control A (comparative embodiment) shown in FIG. 2, irradiation is carried out in exposure periods, so the marking light can change the appearance of the pedestrian in an image. This interferes with pedestrian recognition. In more detail, in pattern recognition that is generally utilized for pedestrian recognition based on image recognition, teacher data (a correct image of a pedestrian in the present embodiment) is learned in advance, and an area having a pattern close to the teacher data is determined (recognized) as an image of a pedestrian. However, if marking light is irradiated to a pedestrian, the marking light changes the appearance of the pedestrian in an image as described above. For this reason, pattern recognition is hindered, with the result that the pedestrian is possibly missed.

Recognition target objects that the object recognition unit 18 recognizes from an image that is captured by the camera of the image recognition sensor 12 include not only an alert target object, such as a pedestrian, that is recognized by the recognition support system 10 but also, for example, a white line on a road. Taking a white line for instance, depending on the shape and irradiation position of marking light, the marking light is possibly erroneously recognized as a white line as described with reference to FIG. 3 below.

Figure 3:
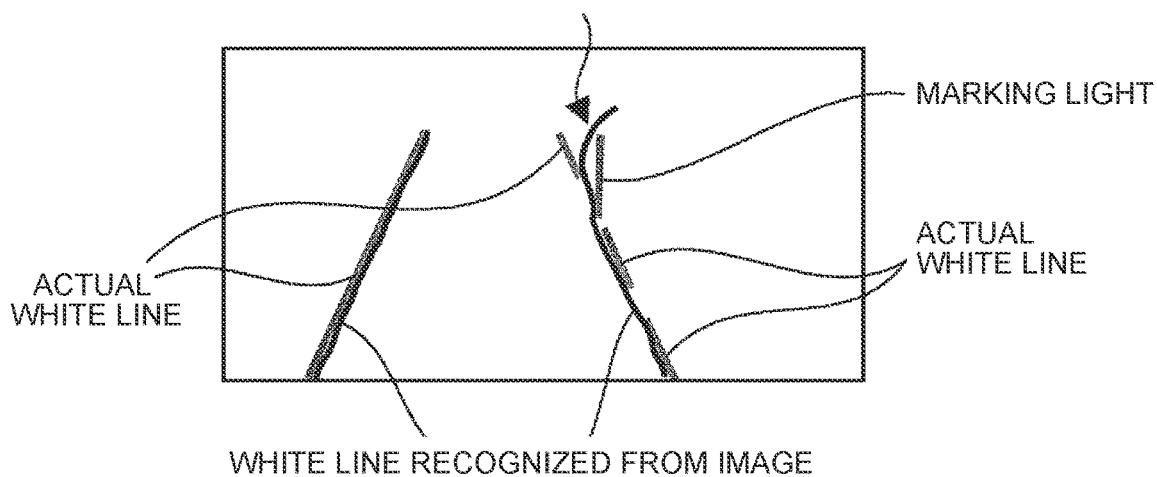
FIG. 3 is a view for illustrating an example of erroneous recognition of a white line due to irradiation of marking light.

FIG. 3 is a view for illustrating an example of erroneous recognition of a white line due to irradiation of marking light, and shows an image captured by the camera. In the example shown in FIG. 3, linear light is irradiated to near a white line at the right side in the drawing. In this example, as a result of the fact that the object recognition unit 18 has erroneously recognized marking light as a white line, part of the white line identified by image recognition deviates from an actual white line as shown in FIG. 3.

2-2. Outline of Light Irradiation Control According to Embodiment

FIG. 4 is a timing chart for illustrating the light irradiation control according to the embodiment of the disclosure. Irradiation according to the light irradiation control is intermittently carried out (hereinafter, referred to as intermittent irradiation) such that an irradiation period and a non-irradiation period are alternately repeated in a light irradiation period T. As shown in FIG. 4, intermittent irradiation is carried out such that the non-irradiation periods coincide with exposure periods and the irradiation periods coincide with non-exposure periods.

In more detail, in the example shown in FIG. 4, a cycle of intermittent irradiation is equal to an exposure cycle of the camera of the image recognition sensor 12, and is a minute value of about several tens of milliseconds. When light is irradiated in such a minute cycle, light appears to be continuously irradiated in the eyes of a human. For this reason, even when such intermittent irradiation is utilized, the appearance of marking light from a pedestrian and a driver is not disturbed. The cycle of intermittent irradiation may be a cycle in which the irradiation period of light and the non-irradiation period of light switch from one to the other. However, when intermittent irradiation is utilized, the following consideration is desirably given to luminance.

That is, in the example of intermittent irradiation shown in FIG. 4, the sum of the irradiation periods in the irradiation period T is half the entire irradiation period (which is the same as the irradiation period T) in the example of continuous irradiation shown in FIG. 2. For this reason, if intermittent irradiation is carried out at a current value equivalent to a current value at which continuous irradiation is carried out, the luminance of marking light decreases to half. For this reason, in order to ensure brightness that is required of marking light, a luminance during intermittent irradiation is desirably appropriately adjusted so as to be higher than a luminance during continuous irradiation (such that the luminance becomes twice as high as the luminance during continuous irradiation in the example of FIG. 4) by, for example, adjusting the current value.

Figure 5:
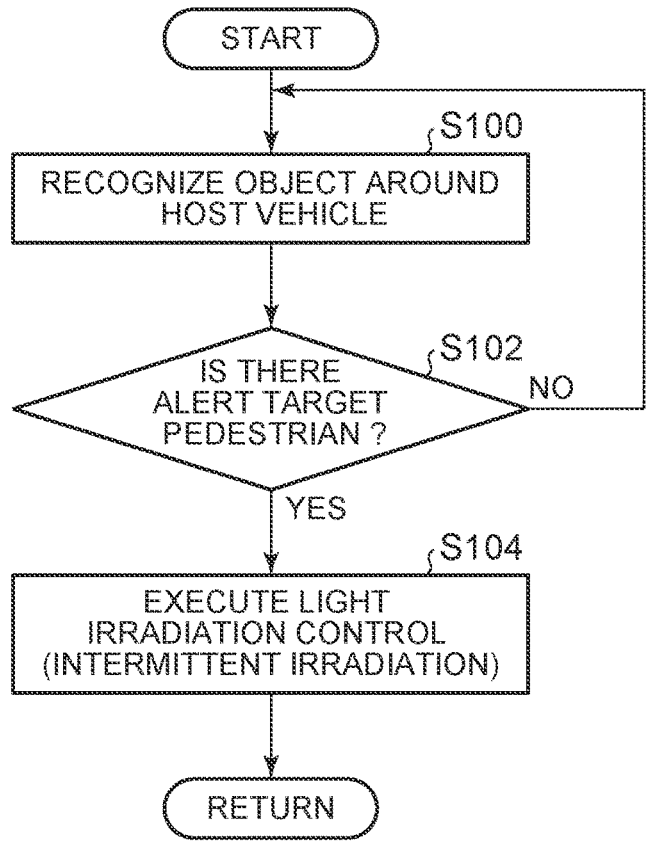
FIG. 5 is a flowchart that shows the routine of a process related to the light irradiation control according to the embodiment of the disclosure.

2-3. Example of Process of ECU Related to Light Irradiation Control According to Embodiment FIG. 5 is a flowchart that shows the routine of a process related to the light irradiation control according to the embodiment of the disclosure. The ECU 16 repeatedly executes the routine while the vehicle is in operation (in more detail, when mutual recognition support is needed).

The process of step S100 of the routine shown in FIG. 5 is executed by the object recognition unit 18. In step S100, an object around the host vehicle is recognized by applying image recognition process to an image received from the image recognition sensor 12. Information about the recognized object is transmitted from the object recognition unit 18 to the light irradiation control unit 20.

The processes of step S102 and step S104 are executed by the light irradiation control unit 20. In step S102, it is determined by utilizing a known technique whether the object recognized by the object recognition unit 18 is a pedestrian that is an alert target.

When negative determination is made in step S102, the process of step S100 is repeatedly executed. On the other hand, when affirmative determination is made in step S102, the process of step S104 is selected. In step S104, the light irradiation control (see FIG. 4) that utilizes intermittent irradiation is executed on the pedestrian that is the alert target identified in the process of step S102.

2-4. Advantageous Effect of Light Irradiation Control According to Embodiment

Figure 6:
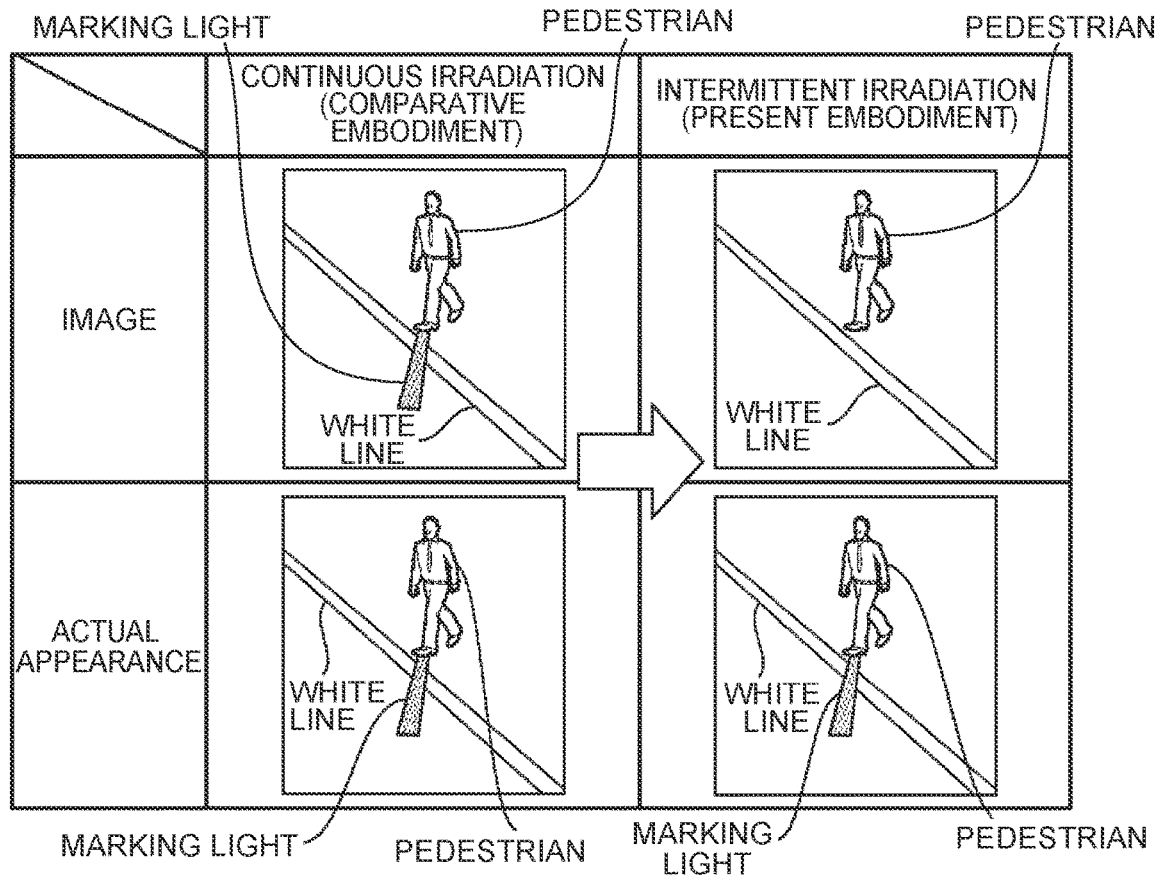
FIG. 6 is a view for illustrating an advantageous effect of the light irradiation control according to the embodiment of the disclosure.

FIG. 6 is a view for illustrating the advantageous effect of the light irradiation control according to the embodiment of the disclosure. In the example of continuous irradiation (light irradiation control A) for comparison, each entire exposure period overlaps with the irradiation period of marking light (see FIG. 2). For this reason, as shown in FIG. 6, it appears that marking light is reflected in not only the drawing that shows an actual appearance but also the image captured by the camera.

On the other hand, with the light irradiation control of the present embodiment, intermittent irradiation is carried out such that irradiation is not carried out in each exposure period of the camera. For this reason, as shown in FIG. 6, it is possible not to reflect marking light in an image captured by the camera while irradiating marking light toward a pedestrian as in the case of the example of continuous irradiation. For this reason, it is possible to reduce a change of the appearance of a pedestrian in an image resulting from irradiation of marking light. As a result, erroneous detection of a pedestrian due to irradiation of marking light is reduced, and erroneous recognition of another recognition target (for example, a white line) in an image is also reduced.

3. Alternative Embodiments of Intermittent Irradiation

In the above-described embodiment, intermittent irradiation is carried out such that the non-irradiation periods coincide with the exposure periods and the irradiation periods coincide with the non-exposure periods (see FIG. 4). However, intermittent irradiation according to the disclosure may be carried out in a mode other than the above-described embodiment as long as intermittent irradiation is carried out such that the non-irradiation period of light overlaps with at least part of the exposure period of the camera. Specifically, intermittent irradiation may be carried out in, for example, modes that are described in first to third alternative embodiments in FIG. 7.

Figure 7:
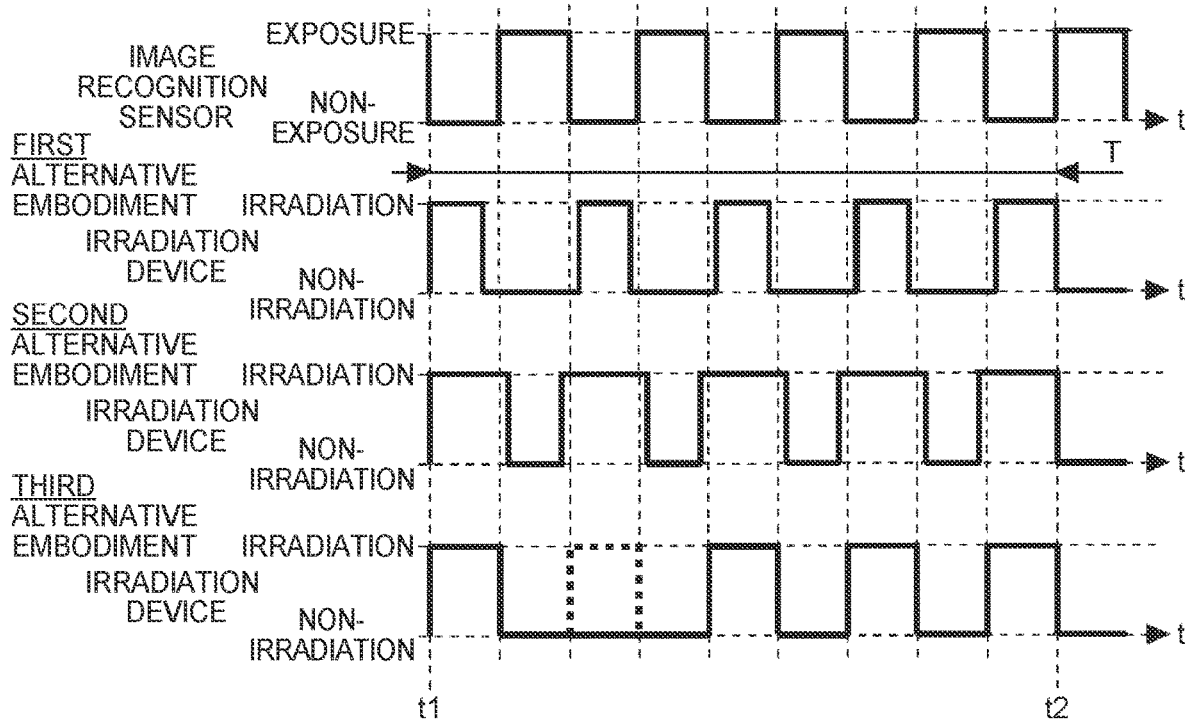
FIG. 7 is a timing chart for illustrating first to third alternative embodiments of intermittent irradiation in the light irradiation control according to the embodiment of the disclosure.

FIG. 7 is a timing chart for illustrating the first to third alternative embodiments of intermittent irradiation in the light irradiation control according to the embodiment of the disclosure. Intermittent irradiation according to the first alternative embodiment in FIG. 7 is carried out such that the non-irradiation period overlaps with not only the entire exposure period but also part of the non-exposure period. As in the case of the first alternative embodiment (also as in the case of the second alternative embodiment), in intermittent irradiation according to the disclosure, the non-irradiation period does not always need to coincide with the exposure period, and the irradiation period does not always need to coincide with the non-exposure period.

The second alternative embodiment in FIG. 7 is an example in which the non-irradiation period does not coincide with the entire exposure period and the non-irradiation period coincides with part of the exposure period. According to this second alternative embodiment, part of the irradiation period coincides with the exposure period. However, even in the thus configured second alternative embodiment, an irradiation time in each exposure period shortens as compared to the example (light irradiation control A) in which the entire exposure period overlaps with the irradiation period. For this reason, in comparison with the example of the light irradiation control A, it is possible to reduce reflection of irradiation light in an image that is captured by the camera.

The third alternative embodiment in FIG. 7 is an example in which the irradiation periods and the non-exposure periods are not synchronized with each other in part of the irradiation periods and non-irradiation periods that are repeated in the irradiation period T. Intermittent irradiation according to the disclosure may be carried out such that the irradiation period and the non-irradiation period are irregularly repeated as in the case of, for example, the third alternative embodiment different from the example shown in FIG. 4, the first alternative embodiment, or the second alternative embodiment, in which the irradiation period and the non-irradiation period are regularly repeated.

What is claimed is:

1. A recognition support system for a vehicle, the recognition support system comprising:
    an image recognition sensor including a camera configured to capture an image of a periphery of a host vehicle while alternately repeating an exposure period and a non-exposure period;
    an irradiation device configured to irradiate light to the periphery of the host vehicle;
    an object recognition unit configured to recognize an object existing in the periphery of the host vehicle by using the image recognition sensor, and
    a light irradiation control unit configured to, when the object recognized by the object recognition unit is an alert target object, carry out intermittent irradiation of light to the alert target object by using the irradiation device, the intermittent irradiation being carried out such that an irradiation period of light and a non-irradiation period of light are alternately repeated and the non-irradiation period overlaps with at least part of the exposure period, wherein
    the intermittent irradiation is carried out such that the non-irradiation period coincides with the exposure period and the irradiation period coincides with the non-exposure period.

2. The recognition support system according to claim 1, wherein
    the intermittent irradiation is carried out such that the irradiation period and the non-irradiation period are alternately repeated in a period from when the intermittent irradiation to the alert target object is started to when the intermittent irradiation to the alert target object ends.

3. The recognition support system according to claim 1, wherein
    the intermittent irradiation is carried out such that switching between the non-irradiation period and the irradiation period is performed at intervals of one hundred milliseconds or shorter.

4. A recognition support system for a vehicle, the recognition support system comprising:
    an image recognition sensor including a camera configured to capture an image of a periphery of a host vehicle while alternately repeating an exposure period and a non-exposure period;
    a lamp that irradiates light to the periphery of the host vehicle; and
    an electronic control unit, including a processor, programmed to:
        recognize an object existing in the periphery of the host vehicle by using the image recognition sensor, and
        carry out intermittent irradiation of light to the object by using the lamp, the intermittent irradiation being carried out such that an irradiation period of light and a non-irradiation period of light are alternately repeated and the non-irradiation period overlaps with at least part of the exposure period, wherein
    the intermittent irradiation is carried out such that the non-irradiation period coincides with the exposure period and the irradiation period coincides with the non-exposure period.

5. The recognition support system according to claim 4, wherein
    the intermittent irradiation is carried out such that the irradiation period and the non-irradiation period are alternately repeated in a period from when the intermittent irradiation to the object is started to when the intermittent irradiation to the object ends.

6. The recognition support system according to claim 4, wherein
    the intermittent irradiation is carried out such that switching between the non-irradiation period and the irradiation period is performed at intervals of one hundred milliseconds or shorter.

* * * * *